United States Patent [19]

de Wit

[11] Patent Number: 4,492,388

[45] Date of Patent: Jan. 8, 1985

[54] COLLAPSIBLE SHOPPING CART

[76] Inventor: Hendrik C. de Wit, Burg. Hogguerstraat 529, 1064 CV Amsterdam, Netherlands

[21] Appl. No.: 335,098

[22] Filed: Dec. 28, 1981

[30] Foreign Application Priority Data

Dec. 29, 1980 [EP] European Pat. Off. ........ 80201239.3

[51] Int. Cl.³ ............................................... B62B 3/02
[52] U.S. Cl. .................................... 280/651; 248/215; 280/33.99 F; 280/DIG. 4
[58] Field of Search ........ 280/651, 650, 642, 33.99 R, 280/79.1 A, 79.3, 33.99 F, DIG. 4; 248/215, 303, 348

[56] References Cited

U.S. PATENT DOCUMENTS

| | | | |
|---|---|---|---|
| 2,705,385 | 4/1955 | Markward | 248/215 |
| 3,190,673 | 6/1965 | Olander | 280/47.34 |
| 3,361,438 | 1/1968 | Davis | 280/33.99 R |
| 3,614,133 | 10/1971 | Ganci | 280/33.99 R |
| 3,774,929 | 11/1973 | Stanley | 280/641 |
| 3,861,633 | 1/1975 | Rappleye | 280/DIG. 4 |
| 4,369,987 | 1/1983 | Witherell | 280/650 |

FOREIGN PATENT DOCUMENTS 485208 8/1975 Australia ...................... 280/DIG. 4

Primary Examiner—Joseph F. Peters, Jr.
Assistant Examiner—Joseph G. McCarthy
Attorney, Agent, or Firm—Becker & Becker, Inc.

[57] ABSTRACT

A shopping cart having a movable frame upon which at least one basket for purchases is mounted via a rod or support structure. The basket is removably fastened to the rod or support structure, which is collapsible on the frame.

8 Claims, 8 Drawing Figures

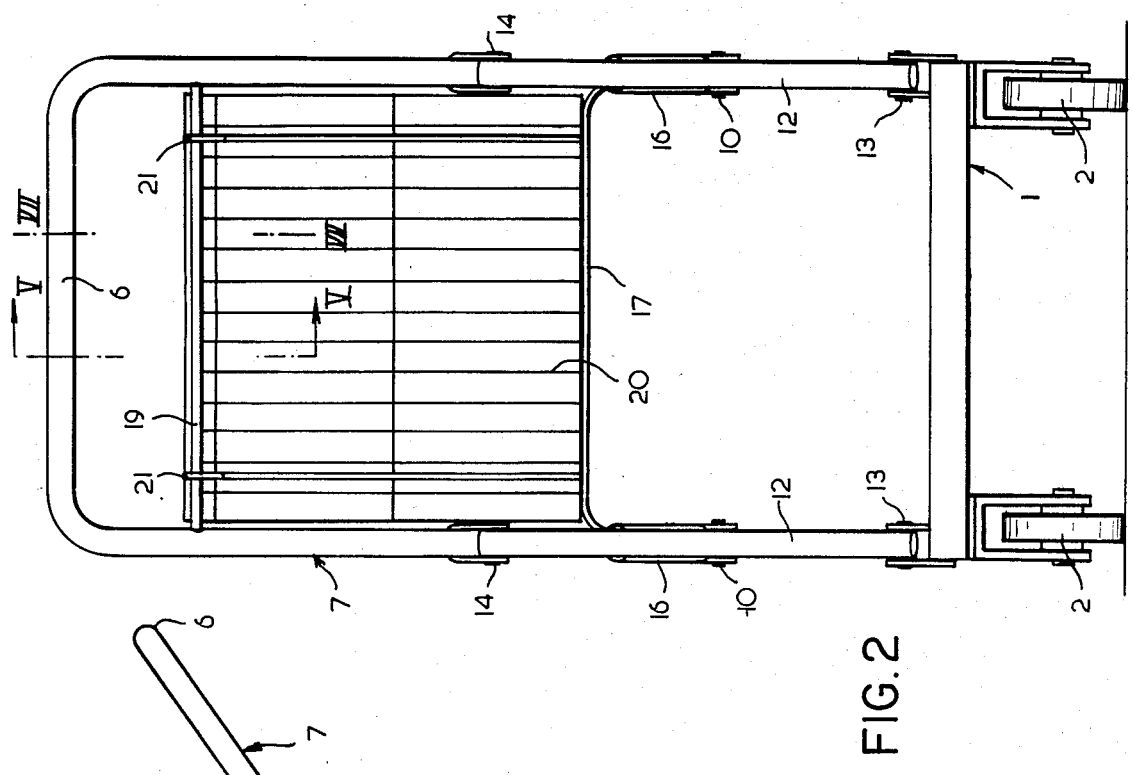
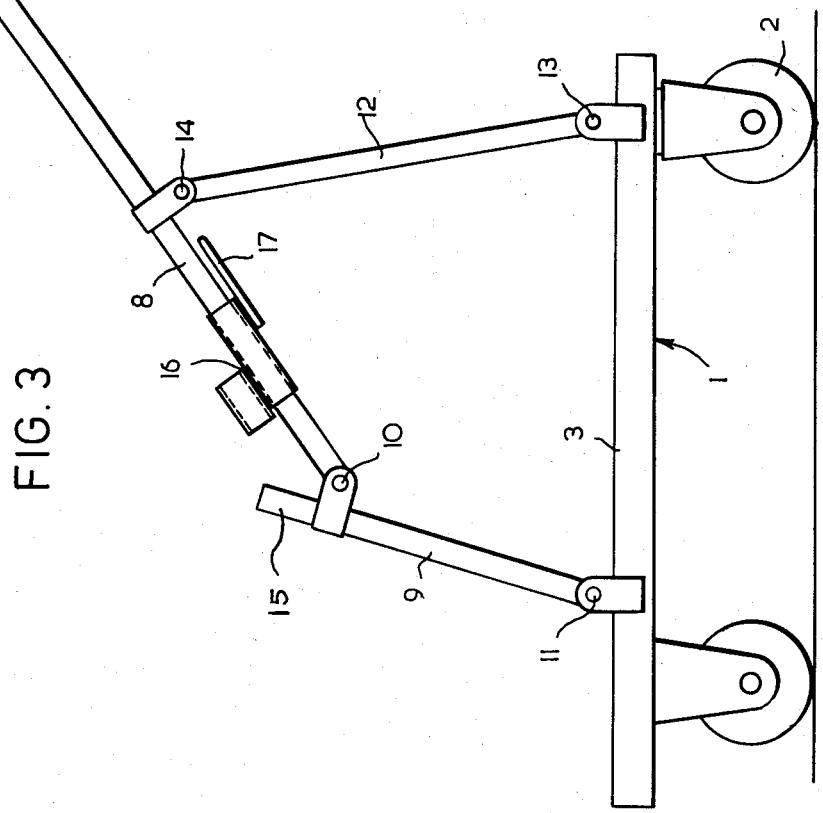

COLLAPSIBLE SHOPPING CART

The present invention relates to a shopping cart comprising a movable frame on which at least one basket for purchases is mounted by means of a rod or support structure.

Shopping carts of this type are used in large numbers at grocery stores or supermarkets, where the shopping carts are made available to the customers. Upon entering the supermarket, the customers take such a cart from the collecting point and push the carts by the shelves. The customers place their selections into the basket, and subsequently take the shopping cart to the register to check out and pay. During this process the articles are taken from the basket and are placed before the cashier on a counter, which is generally equipped with a conveyor belt. The cashier prepares the register tape, and the articles are conveyed by the belt to the end of the counter. After paying, the customer either places the articles in the basket again in order to push the shopping cart outside to the vehicle, where the cart is unloaded and left standing, or the cart is pushed aside in the supermarket and the articles on the counter are packed in cartons or paper bags, which are then carried to the vehicle. In the first situation, the shopping cart is generally left standing where the articles were loaded into the vehicle; these carts are periodically collected by personnel of the supermarket and are again brought to the collecting point. In the second situation, the shopping carts are also collected by personnel of the store and are brought to the collecting point.

The above described manner of operation with the known shopping carts is not completely satisfactory to either the supermarket owner or to the customers. Drawbacks for the supermarket owner and manager are first of all the periodic collection of the carts, which have been put away in the supermarket or outside, and the rearranging of the carts at the collecting point, as well as secondly preparing space for generally old or used cartons from which the customers pick out a suitable one to pack their articles after paying at the register. Disadvantages for the customer are first of all searching for a suitable carton, which is difficult because a large number of the customers searching for a suitable carton from the pile frequently find only torn-open cartons. The second disadvantage for the customer consists in that the articles must be transferred from the basket into the vehicle when no carton is available.

It is an object of the present invention to provide a shopping cart of the type described which does not have the aforementioned disadvantages, and which in addition also has certain advantages.

This object, and other objects and advantages of the present invention, will appear more clearly from the following specification in connection with the accompanying drawings, in which:

FIG. 2 is a rear view of the shopping cart taken in the direction of arrow II of FIG. 1;

FIG. 3 shows the frame with the support or rod structure and without the baskets, with shift pieces being retracted in the starting position for collapsing the cart;

FIG. 7 is a longitudinal section in a plane taken along line VII—VII in FIG. 2, and shows a second variant of a hook for the securing of the first basket, and for hanging a purse or the like.

Figure 1:
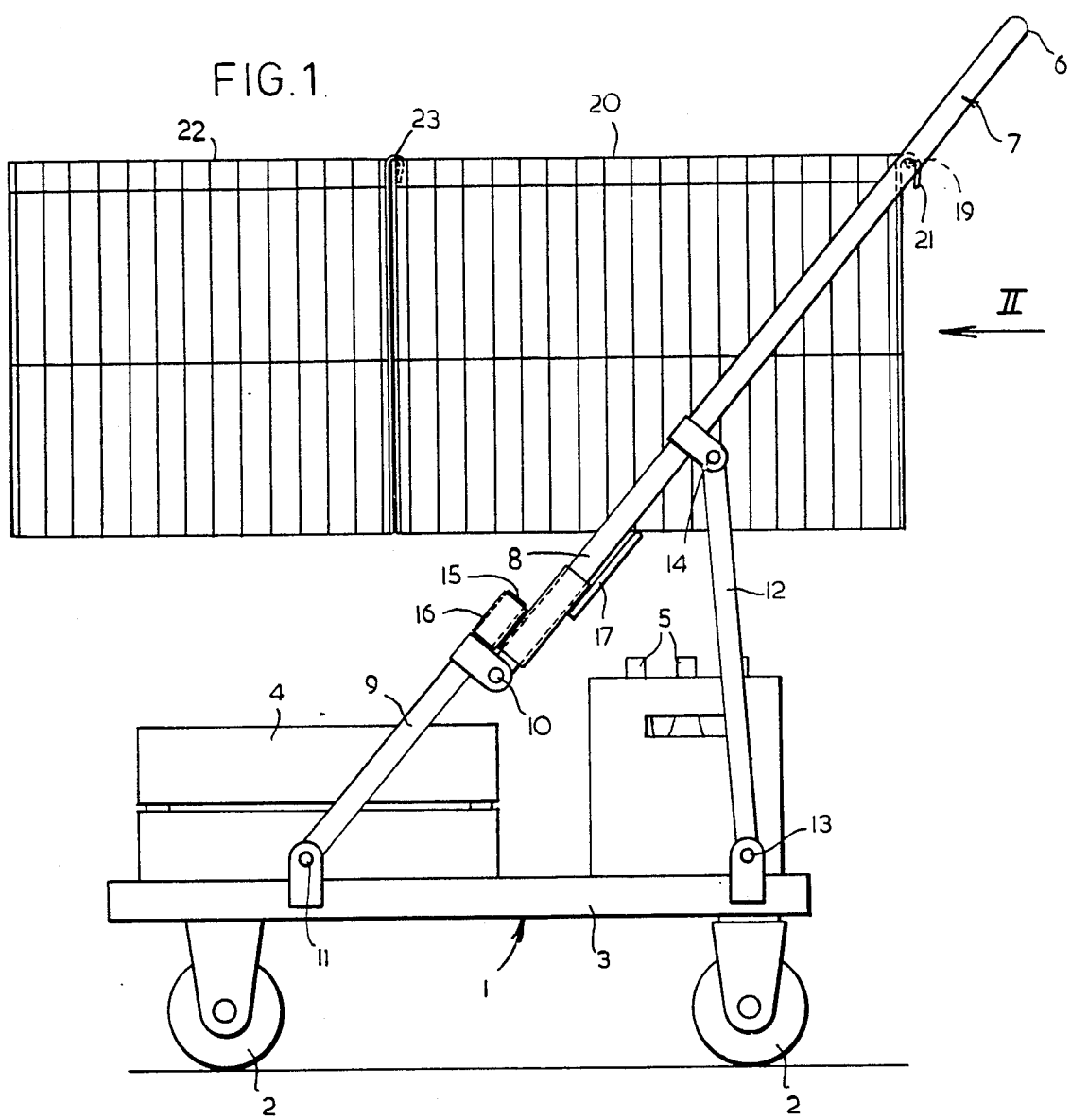
FIG. 1 is a side view of one embodiment of an inventive shopping cart in condition for use.

The shopping cart according to the present invention is characterized primarily in that the basket is removably fastened to the rod or support structure, which in turn can be collapsed or folded together on the frame. With such an embodiment of a shopping cart, the latter can be the personal property of a customer, who takes the shopping cart, in the collapsed condition, in a vehicle to the supermarket where the customer shops; the customer pays at the register and goes to the vehicle again with his own shopping cart, where he places the basket, with the items therein, in the vehicle, and also stows the frame in the collapsed condition in the vehicle. The advantage for the supermarket owner consists in that no personnel is required anymore to collect and arrange the carts at the collecting point, and he also no longer needs to assure that sufficient cartons are always available; a further advantage is that the owner can make other use of the space intended for the cartons.

According to one preferred embodiment of the present invention, the support structure essentially comprises a U-shaped handle, the legs of which, in the moving position, are directed downwardly. The free ends of the legs are pivotally fastened to the frame by means of a first hinge. The middle rod of the U-shaped handle, in the moving position, is located at hand level, so that it can serve as a handgrip for pushing the cart. The legs of the U-shaped handle respectively comprise two members which are pivotally interconnected by means of a second hinge, and which are provided with abutments or stops for the extended or nearly extended final position of the members. The two second hinges are located between the frame and the underside of the basket fastened thereto. Furthermore, an auxiliary rod is provided for each leg; the lower end of the auxiliary rod is pivotally fastened to the frame by means of a third hinge, and the upper end thereof is pivotally fastened to the upper member of the leg by means of a fourth hinge. Such a construction makes it possible to economically produce the inventive shopping cart, while the handling of the cart by the owner is very simple and reliable. In the collapsed condition, the shopping cart is so small that it can even be stowed in the trunk or storage area of a small car.

According to a further development of the present invention, the lower member of a given leg has an extension behind the hinge. This extension cooperates with the upper member of the leg as an abutment or stop for the position in which both members are straight and extended. In this connection, a shift piece is displaceably installed on the upper member between the second and fourth hinges. This shift piece effects the fixing of the members of a leg in the extended position when it is pushed over the extension. In this manner, a reliable support or rod structure is obtained which is easy to handle, even for less adept individuals.

According to another development of the present invention, the two shift pieces can be rigidly connected with each other by a connecting rod, which simultaneously serves as a support for the underside of the first basket. Consequently, the handling of the shift pieces is still further simplified and made safer, since the pinching of fingers is prevented. Structurally, the connecting rod has a further function, namely as a support for the underside of the basket; this reduces production costs. In addition, the basket secures or arrests the shift pieces in the fixing position.

A horizontal transverse bar can advantageously be mounted on the handle in the vicinity of the handgrip portion; the first basket can be suspended on this horizontal transverse bar. Furthermore, it may be expedient to provide a second basket which can be removably fastened to the first basket. Thus a customer can purchase an inventive shopping cart with one basket if his family is small, and with two baskets if his family is larger.

According to one expedient variant, the first basket can be provided with a hook which can be flipped over. After introduction of the first basket into the support structure, the hook can be flipped over in such a way that it is located around the horizontal transverse bar in the vicinity of the handgrip part of the support structure. In this manner the suspension of the first basket is secured. According to a further development of this variant, the hook is embodied as a double hook, so that the second hook end, in the secured position, can be used for hanging a purse or the like.

According to a second expedient variant, likewise for fixing the first basket and for providing a hanging device for a purse or the like, a horizontal transverse bar can be freely rotatably mounted in the handle in the vicinity of the handgrip part of the support structure; the bent or angled-off upper end of a hook is rigidly fastened to the transverse bar. The transverse bar can be rotated together with the hook in such a way that the bent end of the hook can be placed around a bar of the rack or grate of the basket in such a manner that the bent end of the hook rests horizontally on the associated bar, and the upper part of the hook surrounds the bar downwardly. The first basket is in this way effectively secured against tipping, while the actual hook part in the secured position is well suited for hanging a purse or the like.

In accordance with the teaching of the present invention, it is practical if the second basket fits in the first basket.

Furthermore, it is advantageous if the frame has a horizontal rack or grate which can serve as a carrying bottom for purchases. Consequently, the carrying capacity of the inventive shopping cart is considerably increased; additionally, in this manner fragile and non-fragile articles can be separately accommodated.

Referring now to the drawings in detail, FIG. 1 shows a frame 1 which is movable on swivel casters or caster-swivel wheels 2. The frame 1 has a rack or grate 3 which forms a bottom upon which heavy objects such as cases 4 of cans or bottles 5 can be placed. The rod or support structure comprises a U-shaped handle 6, the legs 7 of which each comprise two members 8 and 9. The leg members can be collapsed by means of a hinge 10, while the handle 6 as a whole is pivotally fastened to the frame 1 by means of a hinge 11. The handle 6 is further supported by support rods 12 which are pivotally connected with the frame by means of hinges 13, and with the handle by means of the hinges 14.

An extension 15 of the member 9 extends beyond the hinge 10. In the extended state of the members 8 and 9, the extension 15 rests against the member 8 as illustrated. The final extended position is delimited in this way. The shift pieces 16 serve to fix this final extended position, and these shift pieces 16 can be shifted on the members 8 of the handle and can prevent collapse of the members. The shift pieces 16 are connected with each other by a connecting rod 17 (see also FIG. 2). The handle 6, in the vicinity of the handgrip portion, is further provided with a transverse bar 19 (see also FIG. 2). The hooks 21 of the basket 20 hang on this transverse bar 19, while the underside of the basket 20 rests on the connecting rod 17 of the shift pieces 16. In this way, the shift pieces are at the same time secured in the fixing position. A second basket 22 hangs on the first basket by means of hooks 23.

Figure 4:
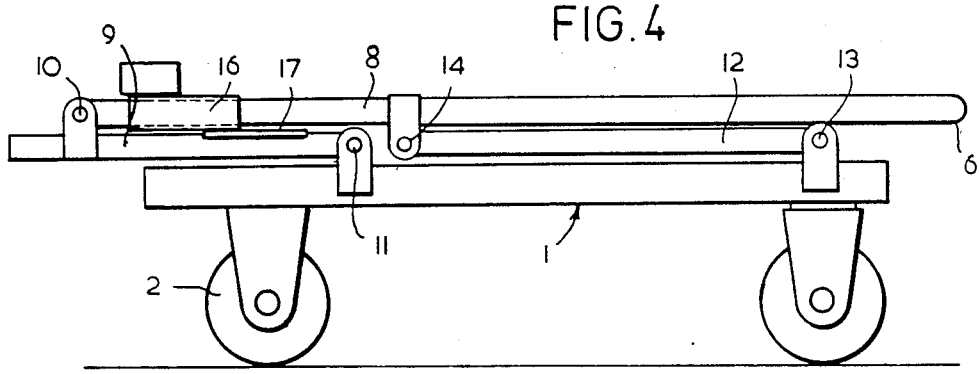
FIG. 4 shows the frame with the support structure in the entirely collapsed state.

The folding or collapsing of the support structure is represented in FIGS. 3 and 4. After removing the baskets, the user can shift the shift pieces 16 upwardly with little effort by pulling on the connecting rod 17. This frees the extensions 15, so that the legs 7 can be collapsed or folded at the hinges 10, as illustrated in FIG. 3. With continued folding, the collapsed position illustrated in FIG. 4 results. The basket 22 fits into the basket, so that only two parts remain, i.e. the collapsed cart and the stacked baskets, which can easily be stored in a small space, such as in a vehicle or in a house.

Figure 5:
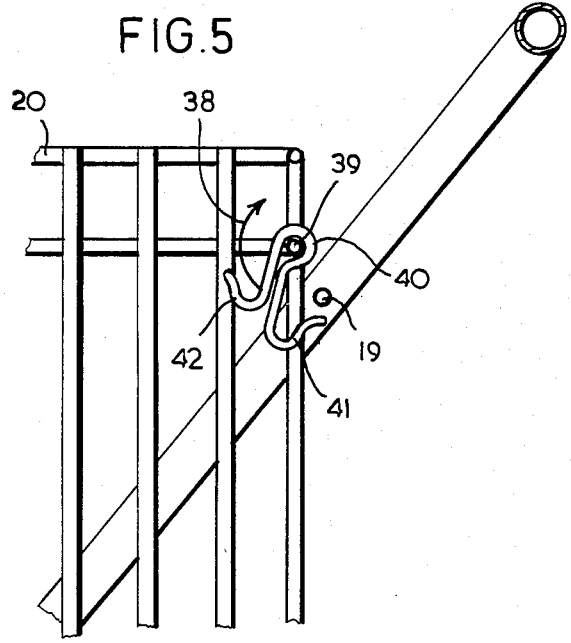
FIG. 5 is a longitudinal section in a plane taken along line V—V in FIG. 2, and shows one variant of a fold-over hook on the first basket; the hook serves to secure the suspension of the first basket on the handle.
Figure 6:
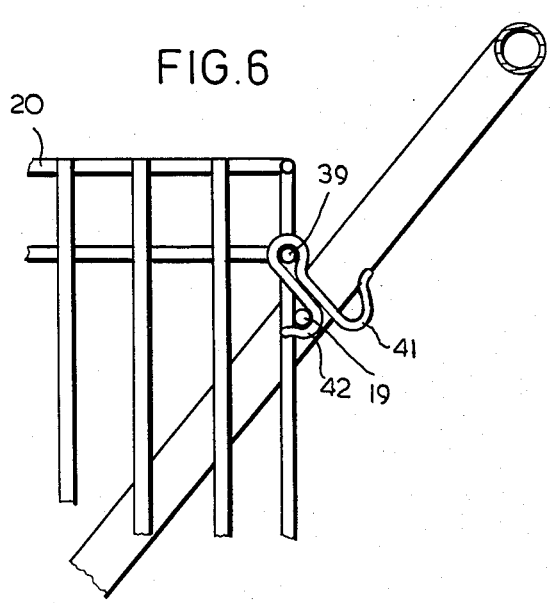
FIG. 6 shows the hook of FIG. 5 in the fastened state.

A portion of the first basket 20 is illustrated in FIG. 5, and shows a hook 40 which is pivotal about a pin 39 on the basket. The hook 40 is embodied as a double hook, and has one hook end 41 and another hook end 42. By flipping the hook 40 over in the direction of the arrow 38, the hook end 42 is placed around the transverse bar 19 of the handle 6, whereby the basket 20 is secured on the support structure. This position is illustrated in FIG. 6. The hook end 41 under these circumstances is located in such a position that it can be used by the owner of the cart in the supermarket for hanging a purse or the like therefrom.

Figure 7:
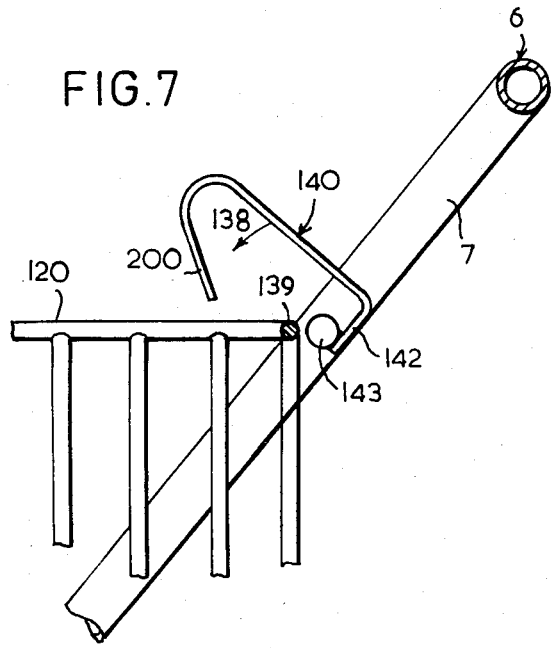
Figure 8:
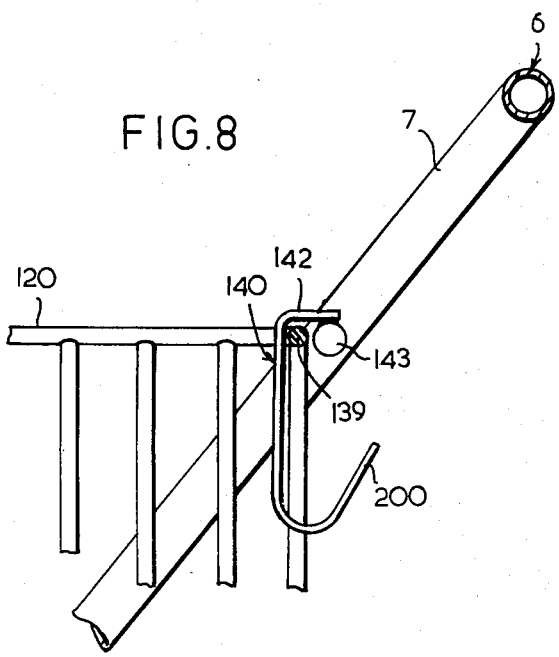
FIG. 8 shows the hook of FIG. 7 in the fastened state.

A hook 140 is illustrated in FIGS. 7 and 8; an angled-off or bent end 142 of this hook 140 is rigidly connected to a transverse bar 143 of the handle 6. The transverse bar 143 is freely rotatably installed in the legs 7 of the handle 6. The hook 140 and the transverse bar accordingly always rotate together. The horizontal bar 139 of the grate or rack of a first basket 120 rests against the transverse bar 143. The hook is rotated in the direction of arrow 138 in FIG. 7, so that the hook occupies the fixing position illustrated in FIG. 8. The upper part and the bent end 142 now surround the bar 139, which consequently is secured against upward and forward movements. The actual hook part 200 on the other hand is located in a position suitable for hanging a purse or the like thereon.

The present invention is, of course, in no way restricted to the specific disclosure of the specification and drawings, but also encompasses any modifications within the scope of the appended claims.

What I claim is:

1. A shopping cart comprising: a movable frame; a support structure collapsibly mounted on said frame; and at least one basket for purchases, said at least one basket being removably fastened to said support structure; said support structure comprising a U-shaped handle having a middle portion and two legs which extend downwardly at an angle in the operating state of said cart, the free end of each of said legs being respectively pivotally connected to said frame by means of a first hinge; said middle portion of said U-shaped handle being located at hand level in the operating state of said cart and forming a handgrip for pushing said cart; each leg of said handle respectively comprising an upper and lower member which are pivotally interconnected by means of a second hinge; the members of each leg being provided with abutment means for the at least nearly extended final position of said members, said second hinge, in the operating state of said cart, being located between said frame and the underside of said at least one basket; a respective auxiliary support rod having two ends being provided for each leg of said handle, one end of said support rod being pivotally connected to said frame by means of a third hinge, and the other end of said support rod being pivotally connected to said upper member of said leg by means of a fourth hinge; said abutment means including, on said lower member of said leg of said handle, an extension located on that side of said second hinge remote from said first hinge, said extension cooperating with said upper member of said leg in said at least nearly extended final position of said members; a shift piece displaceably mounted on each said upper member between said second hinge and said fourth hinge, said shift piece being adapted to be slid over said extension to effect fixing of said members of a given leg in said extended final position; a connecting rod which rigidly interconnects said shift pieces of each leg and simultaneously serves as a support for the underside of said at least one basket, a horizontal transverse bar located in the vicinity of said handgrip portion of said handle and extending between said legs of said handle, said at least one basket being fastened to said transverse bar; said at least one basket including a wire-part, and at least one hook that can be flipped over, said at least one hook, after introduction of said at least one basket into said support structure, being placed around said transverse bar of said handle to effect said fastening of said basket to said support structure, said at least one hook having two hook ends.

2. A shopping cart according to claim 1, which includes a first basket, and a second basket which is removably fastened to said first basket.

3. A shopping cart according to claim 2, in which said second basket fits in said first basket.

4. A shopping cart according to claim 1, in which said frame includes a horizontal rack which serves as a support for purchases.

5. A shopping cart according to claim 1, which includes a transverse bar which is freely rotatably mounted in the vicinity of said handgrip portion of said handle and extends between said legs of said handle; in which said at least one basket includes a horizontal bar which is substantially parallel to said transverse bar in the operating state of said cart; and which includes a hook having a main portion and an upper hook end which extends at substantially right angles to said main portion, said upper hook end being rigidly connected to said transverse bar at a point far enough from said main portion to allow sufficient space to receive said horizontal bar of said basket therebetween to effect said fastening of said basket to said support structure.

6. A shopping cart comprising a movable frame and a support structure mounted on said frame and at least one basket made of wire or the like, removably hooked on to said support structure, said support structure comprising a U-shaped handle having a middle portion and two legs which extend downwardly at an angle in the operating state of said cart, the free end of each of said legs being respectively pivotally connected to said frame by means of a first hinge; said middle portion of said U-shaped handle being located at hand level in the operating state of said cart and forming a handgrip for pushing said cart; each leg of said handle respectively comprising an upper member and a lower member which are pivotally interconnected by means of a second hinge; the members of each leg being provided with abutment means for the extended final position of said members; said second hinge, in the operating state of the cart, being located between said frame and the underside of said at least one basket; a respectively auxiliary support rod having two ends provided for each leg of said handle, one end of said support rod being pivotally connected to said frame by means of a third hinge, and the other end of said support rod being pivotally connected to said upper member of said leg by means of a fourth hinge, said abutment means including, on said lower member of said leg of said handle, an extension located on that side of said second hinge remote from said first hinge, said extension cooperating with said upper member of said leg in said at least nearly extended final position of said members; and a shift piece displaceably mounted on each said upper member between said second hinge and said fourth hinge, said shift piece being adapted to be slid over said extension to effect fixing of said members of a given leg in said extended final position, said shift pieces being rigidly interconnected by a connecting rod, said connecting rod simultaneously serving as a support for the underside of said at least one basket, there being located in the vicinity of the said handgrip portion of said handle furthermore a horizontal transverse bar which extends between said legs of said handle, said at least one wire basket including at least one hook which is pivotally fastened to a wire-part of the basket, so that said hook can be flipped over after introduction of said basket into said support structure, for being placed around said transverse bar of said handle to effect fastening of said basket to said support structure.

7. A shopping cart according to claim 6, in which at least one hook has two hookends.

8. A shopping cart according to claim 6, which includes a first basket and a second basket which is removably fastened to said first basket, and which may nest in said first basket.

* * * * *